United States Patent
Jiang et al.

(10) Patent No.: US 9,270,178 B2
(45) Date of Patent: Feb. 23, 2016

(54) DIGITAL CONTROLLERS AND DIGITAL CONTROL METHODS OF MULTI-PHASE SWITCHING CONVERTERS

(71) Applicant: Chengdu Monolithic Power Systems Co., Ltd., Chengdu (CN)

(72) Inventors: Lijie Jiang, Hangzhou (CN); Xiaokang Wu, Hangzhou (CN); Suhua Luo, Hangzhou (CN); Qian Ouyang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 220 days.

(21) Appl. No.: 14/106,643

(22) Filed: Dec. 13, 2013

(65) Prior Publication Data
US 2014/0167833 A1 Jun. 19, 2014

(30) Foreign Application Priority Data
Dec. 13, 2012 (CN) .......................... 2012 1 0535981

(51) Int. Cl.
*H02M 3/157* (2006.01)
*H02M 3/158* (2006.01)

(52) U.S. Cl.
CPC ............ *H02M 3/1584* (2013.01); *H02M 3/157* (2013.01)

(58) Field of Classification Search
CPC .... H03K 17/16; H02M 3/1584; H02M 3/157; H02M 2001/0003; H02M 1/084
See application file for complete search history.

(56) References Cited

U.S. PATENT DOCUMENTS

| | | | | |
|---|---|---|---|---|
| 7,239,257 B1 * | 7/2007 | Alexander | ............ | H02M 3/157 341/138 |
| 2008/0272744 A1 * | 11/2008 | Melanson | ........... | H02M 1/4225 323/205 |
| 2008/0303501 A1 * | 12/2008 | Prodic | ................... | H02M 3/157 323/283 |
| 2008/0310200 A1 * | 12/2008 | Maksimovic | ....... | H02M 3/1584 363/65 |
| 2009/0243578 A1 * | 10/2009 | Wahby | .................. | H02M 3/157 323/283 |
| 2010/0244726 A1 * | 9/2010 | Melanson | ......... | H02M 3/33523 315/291 |
| 2011/0012687 A1 * | 1/2011 | Effler | .................. | H02M 3/1584 332/110 |
| 2011/0025284 A1 | 2/2011 | Xu et al. | | |
| 2011/0188218 A1 | 8/2011 | Hsing et al. | | |
| 2012/0153917 A1 * | 6/2012 | Adell | .................. | H02M 3/1588 323/283 |
| 2012/0274293 A1 | 11/2012 | Ren et al. | | |
| 2013/0194848 A1 * | 8/2013 | Bernardinis | ........ | H02M 3/1584 363/126 |
| 2013/0307498 A1 | 11/2013 | Jiang et al. | | |
| 2013/0307503 A1 | 11/2013 | Ouyang et al. | | |

* cited by examiner

*Primary Examiner* — Fred E Finch, III
*Assistant Examiner* — Gustavo Rosario Benitez
(74) *Attorney, Agent, or Firm* — Perkins Coie LLP

(57) ABSTRACT

A method for controlling a multi-phase switching converter with a plurality of switching circuits, including: sensing the output current of the switching circuit and generating a current sensing signal; generating a digital phase current signal based on the current sensing signal; subtracting the digital phase current signal from a current reference signal and generating a current error signal; proportionally integrating the current error signal and generating a first bias signal; conducting a sigma-delta modulation of the first bias signal and generating a second bias signal, wherein the first bias signal is a P-bit digital signal, the second bias signal is a Q-bit digital signal, and P is larger than Q; and adjusting a control signal controlling the switching circuit based on the second bias signal.

12 Claims, 8 Drawing Sheets

DIGITAL CONTROLLERS AND DIGITAL CONTROL METHODS OF MULTI-PHASE SWITCHING CONVERTERS

CROSS-REFERENCE TO RELATED APPLICATION(S)

This application claims the benefit of CN application 201210535981.0, filed on Dec. 13$^{th}$, 2012, and incorporated herein by reference.

TECHNICAL FIELD

The present invention generally relates to electronic circuits, and more particularly but not exclusively to digital controllers and digital control methods of multi-phase switching converters.

BACKGROUND

In power solutions of high performance CPU, switching converters with lower output voltage and higher output current are required. Multi-phase switching converters are widely used in these applications because of its good performance. For multi-phase switching converters, how to balance the output current of the plurality of switching circuits is a critical issue. Generally, the average output current of the switching circuits are compared with a reference value. Then the control signals of the switching circuits are adjusted based on the comparison result, so as to realize the current balance.

For prior digital controlled multi-phase switching converters, since the current resolution (minimum change of the average output current caused by the controlled parameter) is limited by the system clock frequency and the sampling rate of the analog digital converter, the current balance performance is not that good. FIG. 1 illustrates the current waveforms of the prior digital controlled multi-phase switching converters, wherein Iave is the average output current of the switching circuit, Iref is the reference current, and Tad is the analog-digital sampling period of the average output current. As shown in FIG. 1, the average output current of the switching circuit is periodically changed around the reference current Iref. A high frequency ripple is formed and the current balance performance is poor.

SUMMARY

Embodiments of the present invention are directed to a digital controller used in a multi-phase switching converter, wherein the multi-phase switching converter comprises a plurality of switching circuits. The digital controller comprises an analog digital converting circuit, a plurality of subtracters, a plurality of proportional integrators, a plurality of sigma-delta modulators and a control circuit. The analog digital converting circuit is configured to receive a plurality of current sensing signals representative of the output current of the plurality of switching circuits, and to generate a plurality of digital phase current signals based on the plurality of current sensing signals. Each of the subtracters has a first input terminal, a second input terminal and an output terminal, wherein the first input terminal is configured to receive the current reference signal, the second input terminal is coupled to the analog digital converting circuit to receive the corresponding digital phase current signal. The subtracter subtracts the digital phase current signal from the current reference signal, and generates a current error signal at the output terminal. Each of the proportional integrators has an input terminal and an output terminal, wherein the input terminal is coupled to the output terminal of the corresponding subtracter to receive the current error signal. The proportional integrator proportionally integrates the current error signal, and generates a first bias signal at the output terminal. Each of the sigma-delta modulators has an input terminal and an output terminal, wherein the input terminal is coupled to the output terminal of the corresponding proportional integrator to receive the first bias signal. The sigma-delta modulator conducts a sigma-delta modulation of the first bias signal, and generates a second bias signal at the output terminal. The first bias signal is a P-bit digital signal, the second bias signal is a Q-bit digital signal, and P is larger than Q. The control circuit is configured to generate a plurality of control signals to control the plurality of switching circuits. The control circuit is coupled to the output terminals of the plurality of sigma-delta modulators to receive the plurality of second bias signals, and configured to adjust the plurality of control signals based on the plurality of second bias signals.

Embodiments of the present invention are also directed to a digital control method of a multi-phase switching converter, wherein the multi-phase switching converter comprises a plurality of switching circuits. The digital control method comprises: sensing the output current of the switching circuit and generating a current sensing signal; generating a digital phase current signal based on the current sensing signal; subtracting the digital phase current signal from a current reference signal and generating a current error signal; proportionally integrating the current error signal and generating a first bias signal; conducting a sigma-delta modulation of the first bias signal and generating a second bias signal, wherein the first bias signal is a P-bit digital signal, the second bias signal is a Q-bit digital signal, and P is larger than Q; and adjusting a control signal controlling the switching circuit based on the second bias signal.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
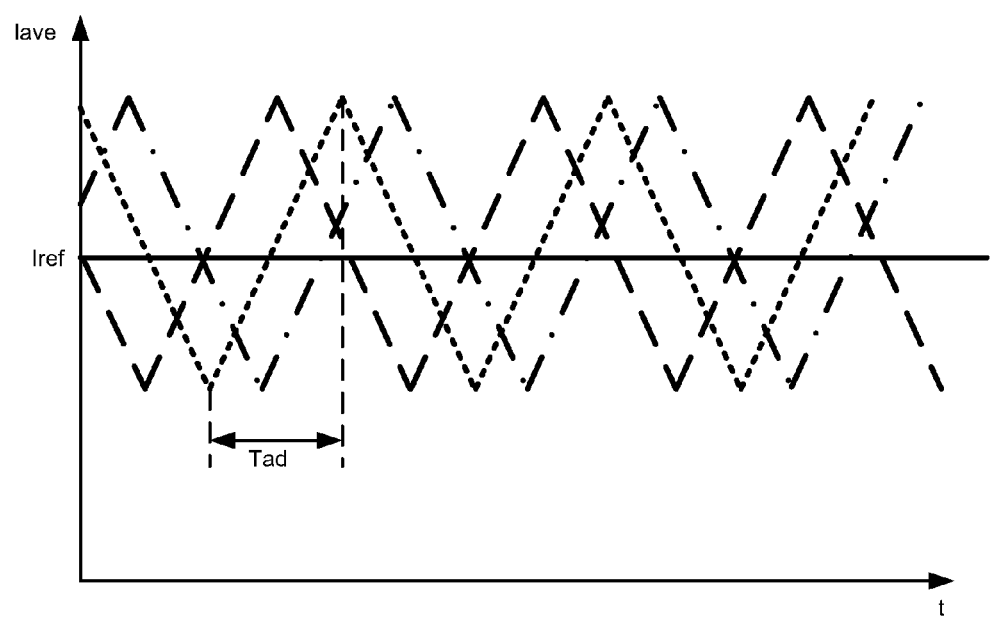
FIG. 1 illustrates the current waveforms of prior digital controlled multi-phase switching converters.
Figure 2:
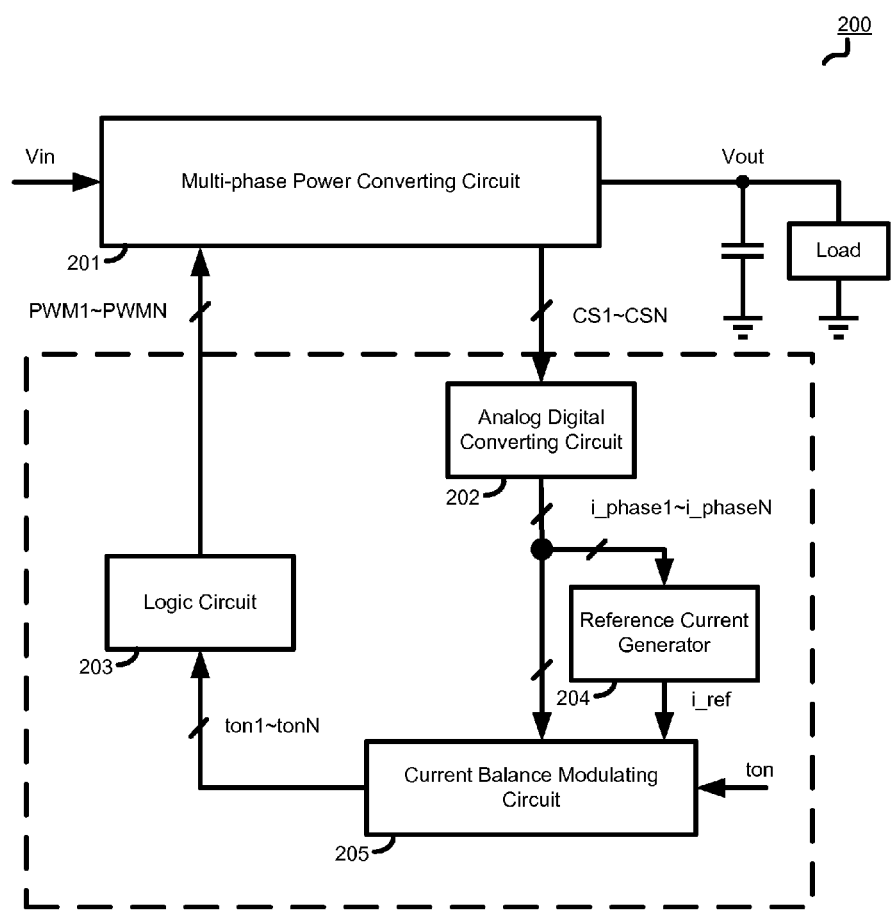
FIG. 2 is a block diagram of a digital controlled multi-phase switching converter 200 in accordance with an embodiment of the present invention.

FIG. 2 is a block diagram of a digital controlled multi-phase switching converter 200 in accordance with an embodiment of the present invention. The multi-phase switching converter 200 comprises a multi-phase power converting circuit 201, an analog digital converting circuit 202, a logic circuit 203 and a current balance modulating circuit 205. The multi-phase power converting circuit 201 comprises N switching circuits, wherein N is an integer larger than 1. The input terminals of the switching circuits receive an input voltage Vin, and the output terminals are coupled together to provide an output voltage Vout to a load. The switching circuits in the multi-phase power converting circuit 201 may be configured in any known DC/DC or AC/DC topology, such as BUCK converter, BOOST converter, Forward converter, Flyback converter and so on.

The analog digital converting circuit 202 is coupled to the switching circuits to receive current sensing signals CS1~CSN representative of the output current of the switching circuits, and generates digital phase current signals i_phase1~i_phaseN based on the current sensing signals. The digital phase current signals i_phase1~i_phaseN may indicate the average output current of the switching circuits. The current balance modulating circuit 205 is coupled to the analog digital converting circuit 202 to receive the digital phase current signals i_phase1~i_phase N, and generates on time signals ton1~tonN based on the digital phase current signals i_phase1~i_phase N, a current reference signal i_ref and a predetermined on time signal ton. The logic circuit 203 is coupled to the current balance modulating circuit 205 to receive the on time signals ton1~tonN, wherein based on the on time signals ton1~tonN, the logic circuit 203 generates control signals PWM1~PWMN to control the switching circuits in the multi-phase power converting circuit 201. The on time signals ton1~tonN are used to control the on time of the switching circuits. The predetermined on time signal ton may be a constant value, or a variable value related to the input voltage Vin and/or the output voltage Vout. The multi-phase switching converter 200 may utilize a constant on-time (COT) control method. It may turn on the corresponding switching circuit when the output voltage Vout becomes smaller than a reference voltage, and turn off the corresponding switching circuit when the on time reaches a time threshold determined by the corresponding on time signal.

In an embodiment, the multi-phase switching converter 200 further comprises a reference current generator 204 receiving the digital phase current signals i_phase1~i_phaseN from the analog digital converting circuit 202. The reference current generator 204 selects one of the digital phase current signals and provides it to the current balance modulating circuit 205 as the current reference signal i_ref. The selected digital phase current signal may be predetermined, or determined by customers according to practical applications. The customer may write a register through a field bus to adjust the current reference signal i_ref.

Figure 3:
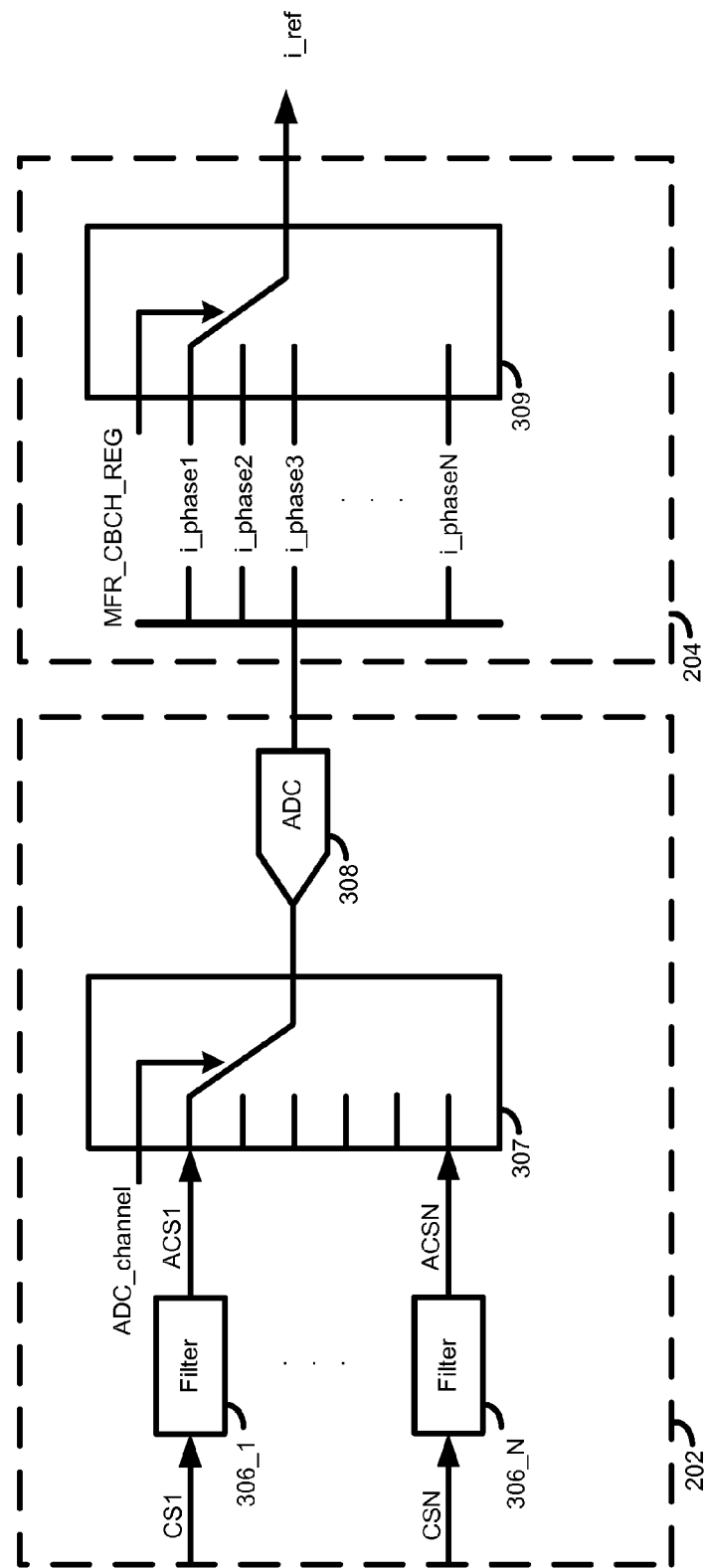
FIG. 3 schematically illustrates the analog digital converting circuit 202 and the reference current generator 204 shown in FIG. 2 in accordance with an embodiment of the present invention.

FIG. 3 schematically illustrates the analog digital converting circuit 202 and the reference current generator 204 shown in FIG. 2 in accordance with an embodiment of the present invention. The analog digital converting circuit 202 comprises filters 306_1~306_N, a multiplexer 307 and an analog digital converter 308. Each of the filters 306_$x$ ($x$=1, 2, ..., N) has an input terminal and an output terminal, wherein the input terminal is configured to receive the current sensing signal CSx representative of the output current of the corresponding switching circuit. The filter 306_$x$ filters the current sensing signal CSx, and generates an average current sensing signal ACSx at the output terminal. The average current sensing signal ACSx is an analog signal representative of the average output current of the corresponding switching circuit.

The multiplexer 307 has N input terminals and an output terminal, wherein the input terminals are respectively coupled to the output terminals of the filters 306_1~306_N to receive the average current sensing signals ACS1~ACSN. Under the control of a channel selecting signal ADC_channel, the multiplexer 307 successively provides the average current sensing signals ACS1~ACSN to its output terminal. The analog digital converter 308 has an input terminal and an output terminal, wherein the input terminal is coupled to the output terminal of the multiplexer 307, and the output terminal is configured to provide the digital phase current signals i_phase1~i_phaseN successively.

The reference current generator 204 comprises a multiplexer 309. The multiplexer 309 has N input terminals and an output terminal, wherein the input terminals are respectively coupled to the output terminal of the analog digital converter 308 to receive the digital phase current signals i_phase1~i_phaseN. Under the control of a register MFR_CBCH_REG, the multiplexer 309 selects one of the digital phase current signals, and provides it to the output terminal as the current reference signal i_ref.

Figure 4:
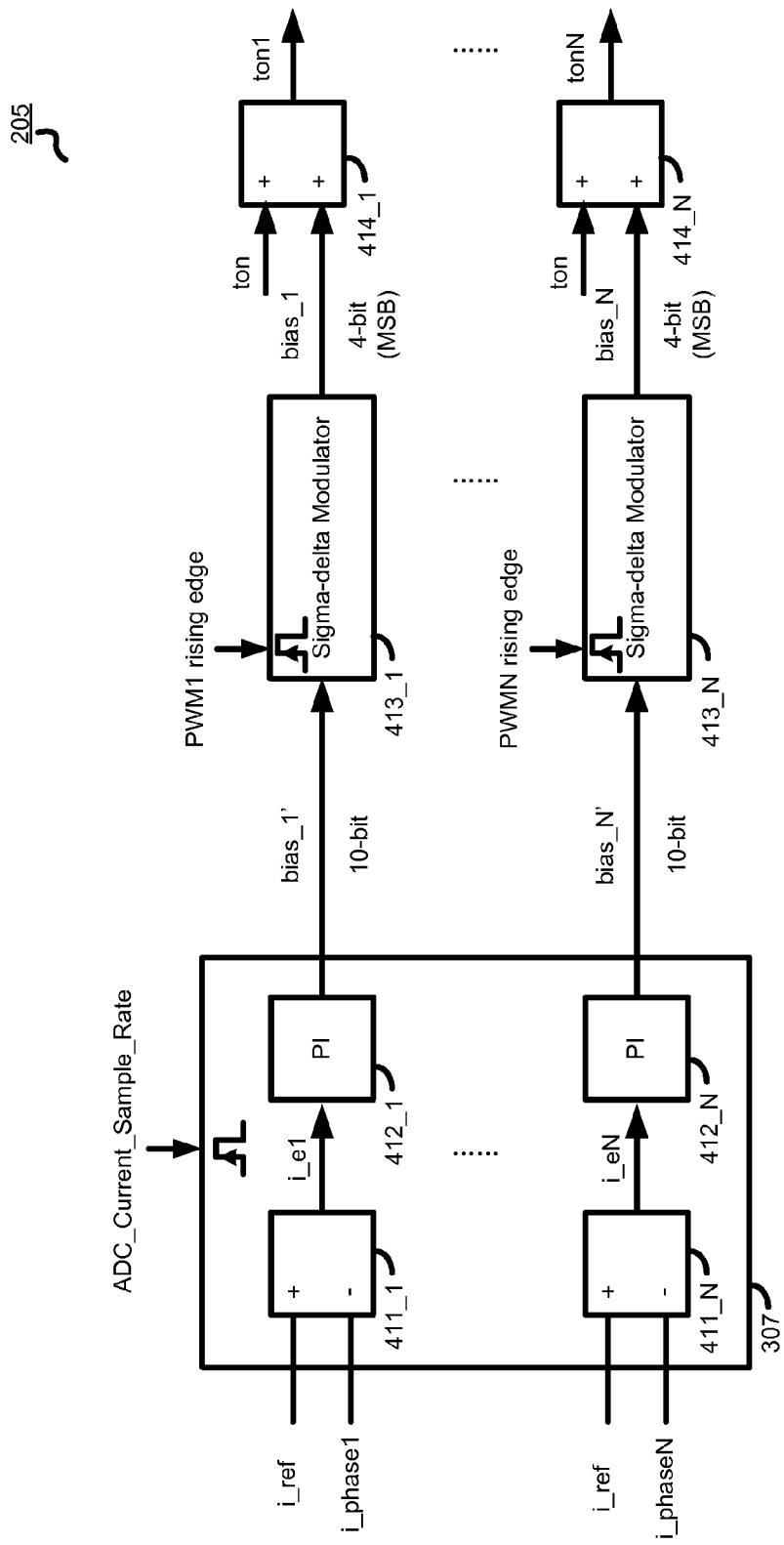
FIG. 4 schematically illustrates the current balance modulating circuit 205 shown in FIG. 2 in accordance with an embodiment of the present invention.

FIG. 4 schematically illustrates the current balance modulating circuit 205 shown in FIG. 2 in accordance with an embodiment of the present invention. The current balance modulating circuit 205 comprises subtracters 411_1~411_N, proportional integrators 412_1~412_N, sigma-delta modulators 413_1~413_N and adders 414_1~414_N. Each of the subtracters 411_$x$ has a first input terminal, a second input terminal and an output terminal, wherein the first input terminal is configured to receive the current reference signal i_ref, the second input terminal is configured to receive the corresponding digital phase current signal i_phasex. The subtracter 411_$x$ subtracts the digital phase current signal i_phasex from the current reference signal i_ref, and generates a current error signal i_ex at the output terminal. Each of the proportional integrators 412_$x$ has an input terminal and an output terminal, wherein the input terminal is coupled to the output terminal of the corresponding subtracter 411_$x$ to receive the current error signal i_ex. The proportional integrator 412_$x$ proportionally integrates the current error signal i_ex, and generates a first bias signal bias_$x$' at the output terminal. Under the control of a pulse signal ADC_Current_Sample_Rate, the proportional integrator 412_$x$ is triggered to conduct the proportional integration only when the average current sensing signal of the corresponding switching circuit is converted by the analog digital converter.

Each of the sigma-delta modulators 413_x has an input terminal and an output terminal, wherein the input terminal is coupled to the output terminal of the corresponding proportional integrator 412_x to receive the first bias signal bias_x'. The sigma-delta modulator 413_x conducts a sigma-delta modulation of the first bias signal bias_x', and generates a second bias signal bias_x at the output terminal. The first bias signal bias_x' is a P-bit (such as 10-bit) digital signal, the second bias signal bias_x is a Q-bit (such as 4-bit) digital signal, and P is larger than Q. In one embodiment, the sigma-delta modulator 413_x is triggered to conduct the sigma-delta modulation at the rising edge of the corresponding control signal PWMx. Each of the adders 414_x has a first input terminal, a second input terminal and an output terminal, wherein the first input terminal is configured to receive the predetermined on time signal ton, the second input terminal is coupled to the output terminal of the corresponding sigma-delta modulator 413_x to receive the second bias signal bias_x. The adder 414_x adds the second bias signal bias_x to the predetermined on time signal ton, and generates the on time signal tonx at the output terminal.

Figure 5:
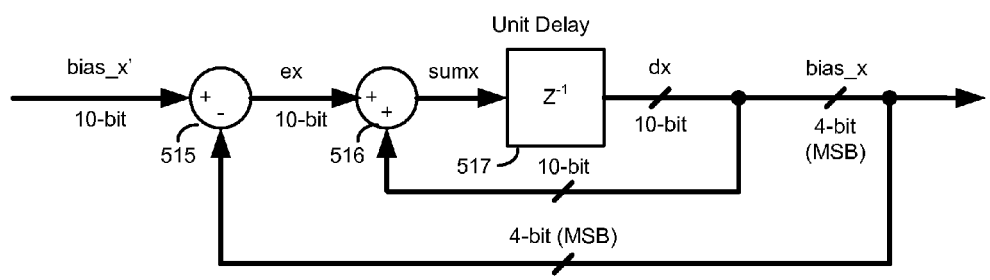
FIG. 5 schematically illustrates one sigma-delta modulator shown in FIG. 4 in accordance with an embodiment of the present invention.

FIG. 5 schematically illustrates one sigma-delta modulator shown in FIG. 4 in accordance with an embodiment of the present invention. The sigma-delta modulator comprises a subtracter 515, an adder 516 and a unit delay block 517. The subtracter 515 has a first input terminal, a second input terminal and an output terminal, wherein the first input terminal is configured to receive the first bias signal bias_x', the second input terminal is configured to receive the second bias signal bias_x. The subtracter 515 subtracts the second bias signal bias_x from the first bias signal bias_x', and generates an error signal ex at the output terminal. Since the first bias signal bias_x' is a P-bit digital signal and the second bias signal bias_x is a Q-bit digital signal, the subtracter 515 fills the insufficient lower bits of the second bias signal bias_x with zero when conducting the subtraction. Same with the first bias signal bias_x', the error signal ex generated by the subtracter 515 is also a P-bit (such as 10-bit) digital signal. The adder 516 has a first input terminal, a second input terminal and an output terminal, wherein the first input terminal is coupled to the output terminal of the subtracter 515 to receive the error signal ex, the second input terminal is configured to receive a loop signal dx. The adder 516 adds the loop signal dx to the error signal ex, and generates a sum signal sumx at the output terminal. The unit delay block 517 has an input terminal and an output terminal, wherein the input terminal is coupled to the output terminal of the adder 516 to receive the sum signal sumx. The unit delay block 517 delays the sum signal sumx, and provides the delayed signal to the second input terminal of the adder 516 as the loop signal dx. The delay time of the unit delay block 517 may be equal to the switching cycle of the corresponding switching circuit or any other suitable value. The loop signal dx is a P-bit (such as 10-bit) digital signal. The higher Q bits (such as the higher 4 bits) of the loop signal dx is extracted as the second bias signal bias_x.

A negative feedback loop is formed by the subtracter 515, the adder 516 and the unit delay block 517. The higher Q bits (such as the higher 4 bits) of the first bias signal bias_x' is a constant bias portion which is used for current balance. The lower (P-Q) bits (such as the lower 6 bits) of the first bias signal bias_x' is used to modulate the lowest bit of the second bias signal bias_x, so as to increase the current resolution of the multi-phase switching converter. The second bias signal bias_x may be deemed as a pulse signal with a magnitude of 1 LSB based on the higher Q bits of the first bias signal bias_x'. The interval between the pulses is variable and determined by the feedback loop. The smaller the lower (P-Q) bits of the first bias signal bias_x', the longer the interval, and vice versa. So, the first bias signal bias_x' is reflected by the average value of the second bias signal bias_x in the analog-digital sampling period Tad.

The current resolution of the multi-phase switching converter is highly increased by the sigma-delta modulator. In applications with P=10 and Q=4, the current resolution of the multi-phase switching converter is improved by 64 times compared with the prior art. The high current resolution can efficiently avoid the high frequency ripples in the average output current of the switching circuits, and improve the current balance performance of the multi-phase switching converter.

In the embodiments described above, the second bias signal generated by the sigma-delta modulator is used to adjust the on time of the switching circuit. Persons of ordinary skill in the art can recognize, however, that the second bias signal may also be used to adjust the switching frequency, duty cycle and other parameters of the switching circuit as long as the average output current of the switching circuit can be regulated. For example, based on the second bias signal, the duty cycle of the switching circuit may be decreased when the average output current of the switching circuit is larger than the reference value, and increased when the average output current is smaller than the reference value.

Figure 6:
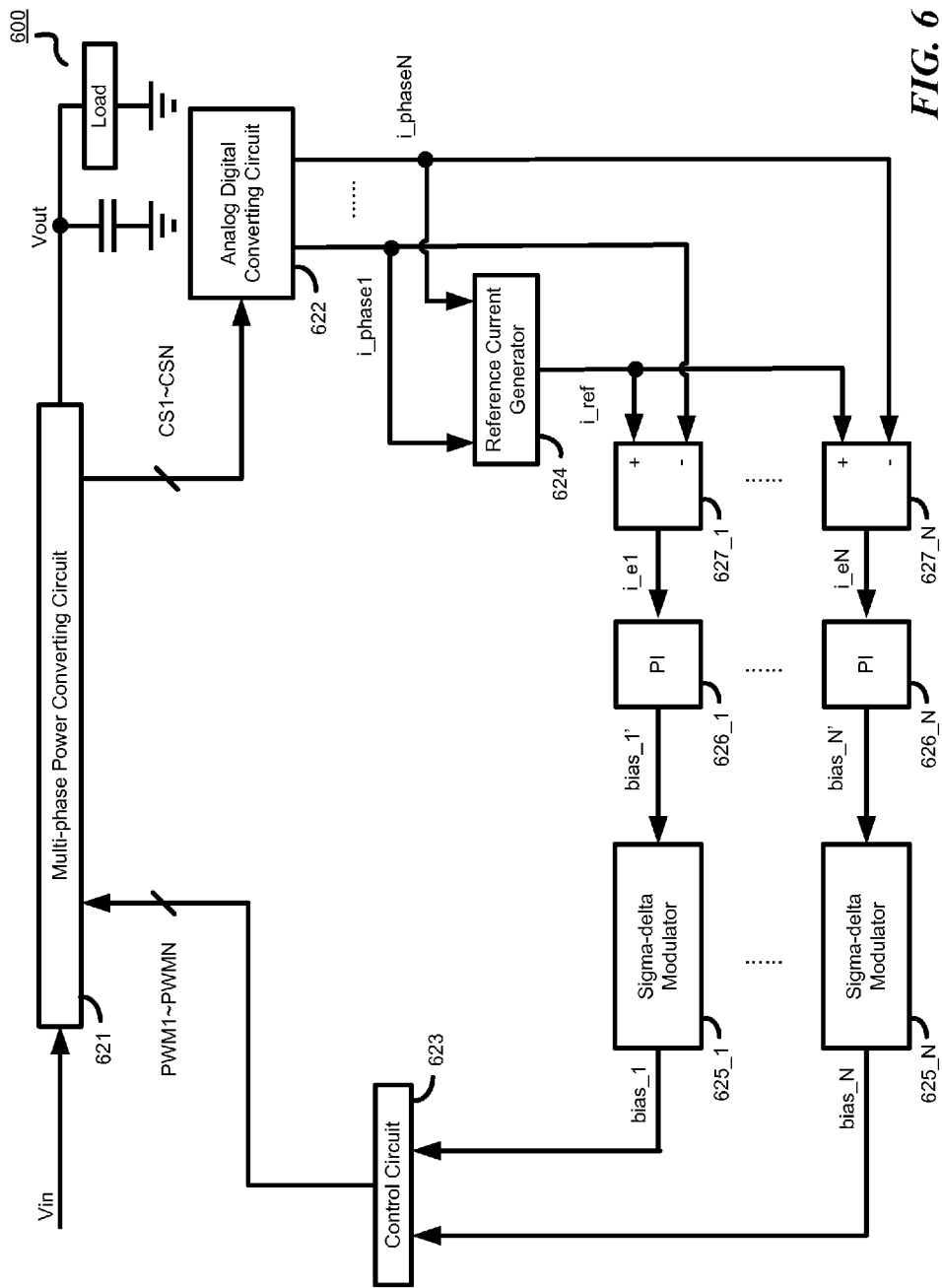
FIG. 6 is a block diagram of a digital controlled multi-phase switching converter 600 in accordance with an embodiment of the present invention.

FIG. 6 is a block diagram of a digital controlled multi-phase switching converter 600 in accordance with an embodiment of the present invention. The multi-phase switching converter 600 comprises a multi-phase power converting circuit 621, an analog digital converting circuit 622, a control circuit 623, subtracters 627_1~627_N, proportional integrators 626_1~626_N and sigma-delta modulators 625_1~625_N. The multi-phase power converting circuit 621, analog digital converting circuit 622, subtracters 627_1~627_N, proportional integrators 626_1~626_N and sigma-delta modulators 625_1~625_N are substantially same with the corresponding circuits mention in the previous embodiments. The control circuit 623 generates control signals PWM1~PWMN to control the switching circuits in the multi-phase power converting circuit 621. The control circuit 623 is coupled to the output terminals of the sigma-delta modulators 625_1~625_N to receive the second bias signals bias_1~bias_N, and configured to adjust the control signals PWM1~PWMN based on the second bias signals. The control circuit 623 may adjust the frequency, duty cycle or other suitable parameters of the control signals based on the second bias signals, so as to adjust the average output current of the switching circuits.

In an embodiment, the multi-phase switching converter 600 further comprises a reference current generator 624 receiving the digital phase current signals i_phase1~i_phaseN. The reference current generator 624 selects one of the digital phase current signals and provides it to the subtracters 627_1~627_N as the current reference signal i_ref.

Figure 7:
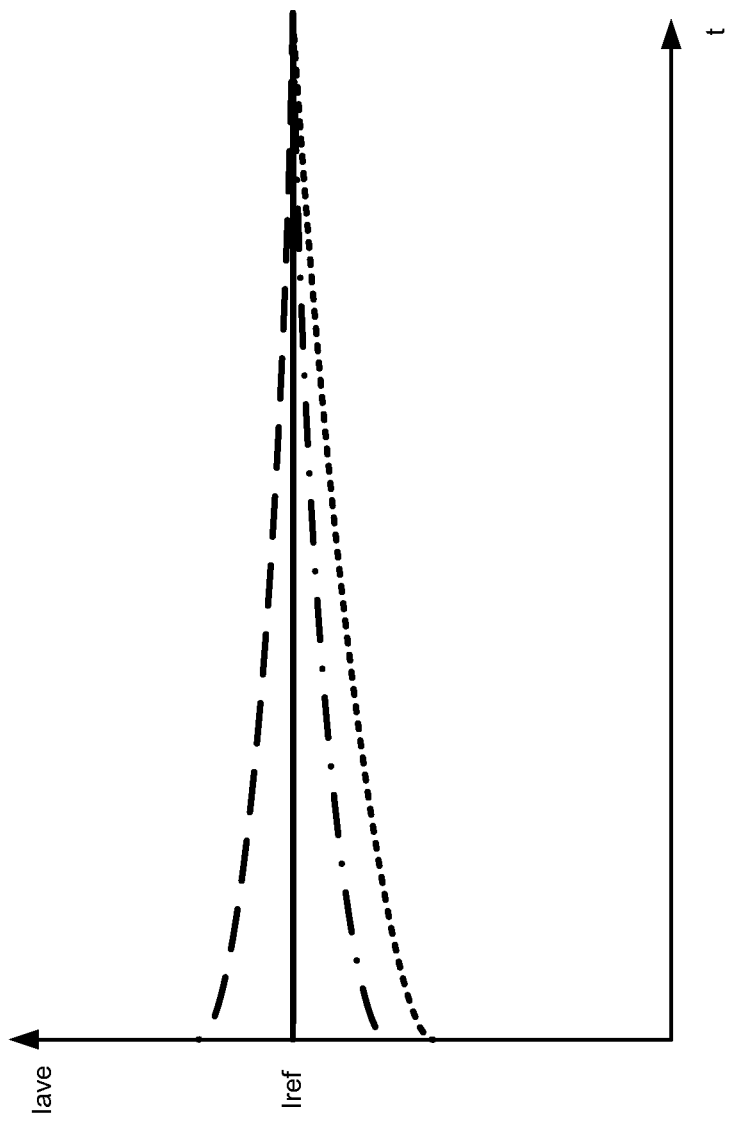
FIG. 7 illustrates the current waveforms of a digital controlled multi-phase switching converter in accordance with an embodiment of the present invention.

FIG. 7 illustrates the current waveforms of a digital controlled multi-phase switching converter in accordance with an embodiment of the present invention. As shown in FIG. 7, the current resolution of the multi-phase switching converter is increased through the sigma-delta modulation. The average output current of the switching circuits approach the reference current Iref slowly and the high frequency ripples in the prior art is eliminated. Thus the current balance performance of the multi-phase switching converter is improved.

Figure 8:
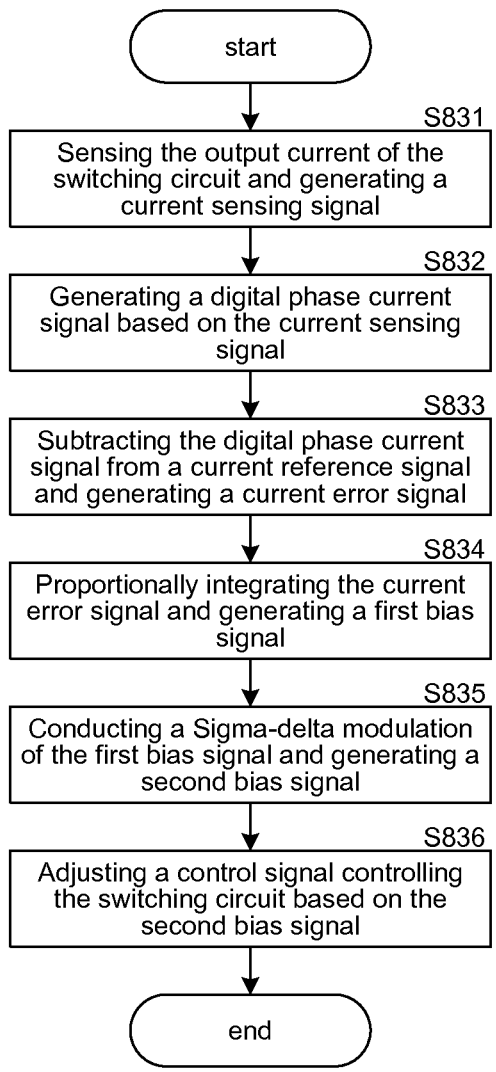
FIG. 8 is a working flow chart of a digital control method of a multi-phase switching converter in accordance with an embodiment of the present invention.

FIG. 8 is a working flow chart of a digital control method of a multi-phase switching converter in accordance with an embodiment of the present invention. It comprises steps S831~S836.

At step S831, the output current of the switching circuit is sensed and a current sensing signal is generated.

At step S832, a digital phase current signal is generated based on the current sensing signal.

At step S833, the digital phase current signal is subtracted from a current reference signal to generate a current error signal.

At step S834, the current error signal is proportionally integrated to generate a first bias signal.

At step S835, a Sigma-delta modulation is conducted to the first bias signal to generate a second bias signal, wherein the first bias signal is a P-bit digital signal, the second bias signal is a Q-bit digital signal, and P is larger than Q. In an embodiment, the step S835 comprises: subtracting the second bias signal from the first bias signal and generating an error signal; adding a loop signal to the error signal and generating a sum signal; delaying the sum signal and generating the loop signal; and extracting the higher Q bits of the loop signal as the second bias signal.

At step S836, a control signal controlling the switching circuit is adjusted based on the second bias signal.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A digital controller used in a multi-phase switching converter, wherein the multi-phase switching converter comprises a plurality of switching circuits, the digital controller comprises:
   an analog digital converting circuit coupled to the plurality of switching circuits, wherein the analog digital converting circuit is configured to receive a plurality of current sensing signals representative of the output current of the plurality of switching circuits, and to generate a plurality of digital phase current signals based on the plurality of current sensing signals;
   a current balance modulating circuit coupled to the analog digital converting circuit to receive the plurality of digital phase current signals, wherein the current balance modulating circuit is configured to generate a plurality of on time signals based on the plurality of digital phase current signals, a current reference signal and a predetermined on time signal; and
   a logic circuit coupled to the current balance modulating circuit to receive the plurality of on time signals, wherein based on the plurality of on time signals, the logic circuit generates a plurality of control signals to control the plurality of switching circuits;
   wherein the current balance modulating circuit comprises:
   a plurality of subtracters with each of the subtracters having a first input terminal, a second input terminal and an output terminal, wherein the first input terminal is configured to receive the current reference signal, the second input terminal is coupled to the analog digital converting circuit to receive the corresponding digital phase current signal, and wherein the subtracter subtracts the digital phase current signal from the current reference signal, and generates a current error signal at the output terminal;
   a plurality of proportional integrators with each of the proportional integrators having an input terminal and an output terminal, wherein the input terminal is coupled to the output terminal of the corresponding subtracter to receive the current error signal, and wherein the proportional integrator proportionally integrates the current error signal, and generates a first bias signal at the output terminal;
   a plurality of sigma-delta modulators with each of the sigma-delta modulators having an input terminal and an output terminal, wherein the input terminal is coupled to the output terminal of the corresponding proportional integrator to receive the first bias signal, and wherein the sigma-delta modulator conducts a sigma-delta modulation of the first bias signal, and generates a second bias signal at the output terminal, wherein the first bias signal is a P-bit digital signal, the second bias signal is a Q-bit digital signal, and P is larger than Q; and
   a plurality of adders with each of the adders having a first input terminal, a second input terminal and an output terminal, wherein the first input terminal is configured to receive the predetermined on time signal, the second input terminal is coupled to the output terminal of the corresponding sigma-delta modulator to receive the second bias signal, and wherein the adder adds the second bias signal to the predetermined on time signal, and generates the on time signal at the output terminal.

2. The digital controller of claim 1, wherein the sigma-delta modulator comprises:
   a first subtracter having a first input terminal, a second input terminal and an output terminal, wherein the first input terminal is coupled to the corresponding proportional integrator to receive the first bias signal, the second input terminal is configured to receive the second bias signal, and wherein the first subtracter subtracts the second bias signal from the first bias signal, and generates an error signal at the output terminal;
   a first adder having a first input terminal, a second input terminal and an output terminal, wherein the first input terminal is coupled to the output terminal of the first subtracter to receive the error signal, the second input terminal is configured to receive a loop signal, and wherein the first adder adds the loop signal to the error signal, and generates a sum signal at the output terminal; and
   an unit delay block having an input terminal and an output terminal, wherein the input terminal is coupled to the output terminal of the first adder to receive the sum signal, and wherein the unit delay block delays the sum signal, and provides the delayed signal to the second input terminal of the first adder as the loop signal;
   wherein the higher Q bits of the loop signal is extracted as the second bias signal.

3. The digital controller of claim 1, further comprising a reference current generator having a plurality of input terminals and an output terminal, wherein the plurality of input terminals are respectively coupled to the analog digital converting circuit to receive the plurality of digital phase current signals, the output terminal is coupled to the current balance modulating circuit to provide the current reference signal, and wherein the reference current generator selects one of the plurality of digital phase current signals as the current reference signal.

4. The digital controller of claim 1, wherein the analog digital converting circuit comprises:
a plurality of filters with each of the filters having an input terminal and an output terminal, wherein the input terminal is configured to receive the current sensing signal representative of the output current of the corresponding switching circuit, and wherein the filter filters the current sensing signal, and generates an average current sensing signal at the output terminal;
a multiplexer having a plurality of input terminals and an output terminal, wherein the plurality of input terminals are respectively coupled to the output terminals of the plurality of filters to receive the plurality of average current sensing signals; and
an analog digital converter having an input terminal and an output terminal, wherein the input terminal is coupled to the output terminal of the multiplexer, and the output terminal is configured to provide the plurality of digital phase current signals successively.

5. The digital controller of claim 1, wherein the sigma-delta modulator is triggered to conduct the sigma-delta modulation at the rising edge of the corresponding control signal.

6. The digital controller of claim 2, wherein the delay time of the unit delay block is equal to the switching cycle of the corresponding switching circuit.

7. A digital controller used in a multi-phase switching converter, wherein the multi-phase switching converter comprises a plurality of switching circuits, the digital controller comprises:
an analog digital converting circuit coupled to the plurality of switching circuits, wherein the analog digital converting circuit is configured to receive a plurality of current sensing signals representative of the output current of the plurality of switching circuits, and to generate a plurality of digital phase current signals based on the plurality of current sensing signals;
a plurality of subtracters with each of the subtracters having a first input terminal, a second input terminal and an output terminal, wherein the first input terminal is configured to receive the current reference signal, the second input terminal is coupled to the analog digital converting circuit to receive the corresponding digital phase current signal, and wherein the subtracter subtracts the digital phase current signal from the current reference signal, and generates a current error signal at the output terminal;
a plurality of proportional integrators with each of the proportional integrators having an input terminal and an output terminal, wherein the input terminal is coupled to the output terminal of the corresponding subtracter to receive the current error signal, and wherein the proportional integrator proportionally integrates the current error signal, and generates a first bias signal at the output terminal;
a plurality of sigma-delta modulators with each of the sigma-delta modulators having an input terminal and an output terminal, wherein the input terminal is coupled to the output terminal of the corresponding proportional integrator to receive the first bias signal, and wherein the sigma-delta modulator conducts a sigma-delta modulation of the first bias signal, and generates a second bias signal at the output terminal, wherein the first bias signal is a P-bit digital signal, the second bias signal is a Q-bit digital signal, and P is larger than Q; and
a control circuit configured to generate a plurality of control signals to control the plurality of switching circuits, wherein the control circuit is coupled to the output terminals of the plurality of sigma-delta modulators to receive the plurality of second bias signals, and configured to adjust the plurality of control signals based on the plurality of second bias signals.

8. The digital controller of claim 7, wherein the sigma-delta modulator comprises:
a first subtracter having a first input terminal, a second input terminal and an output terminal, wherein the first input terminal is coupled to the corresponding proportional integrator to receive the first bias signal, the second input terminal is configured to receive the second bias signal, and wherein the first subtracter subtracts the second bias signal from the first bias signal, and generates an error signal at the output terminal;
a first adder having a first input terminal, a second input terminal and an output terminal, wherein the first input terminal is coupled to the output terminal of the first subtracter to receive the error signal, the second input terminal is configured to receive a loop signal, and wherein the first adder adds the loop signal to the error signal, and generates a sum signal at the output terminal; and
an unit delay block having an input terminal and an output terminal, wherein the input terminal is coupled to the output terminal of the first adder to receive the sum signal, and wherein the unit delay block delays the sum signal, and provides the delayed signal to the second input terminal of the first adder as the loop signal;
wherein the higher Q bits of the loop signal is extracted as the second bias signal.

9. The digital controller of claim 7, further comprising a reference current generator having a plurality of input terminals and an output terminal, wherein the plurality of input terminals are respectively coupled to the analog digital converting circuit to receive the plurality of digital phase current signals, the output terminal is coupled to the current balance modulating circuit to provide the current reference signal, and wherein the reference current generator selects one of the plurality of digital phase current signals as the current reference signal.

10. The digital controller of claim 7, wherein the analog digital converter comprises:
a plurality of filters with each of the filters having an input terminal and an output terminal, wherein the input terminal is configured to receive the current sensing signal representative of the output current of the corresponding switching circuit, and wherein the filter filters the current sensing signal, and generates an average current sensing signal at the output terminal;
a multiplexer having a plurality of input terminals and an output terminal, wherein the plurality of input terminals are respectively coupled to the output terminals of the plurality of filters to receive the plurality of average current sensing signals; and
an analog digital converter having an input terminal and an output terminal, wherein the input terminal is coupled to the output terminal of the multiplexer, and the output terminal is configured to provide the plurality of digital phase current signals successively.

11. The digital controller of claim 7, wherein the sigma-delta modulator is triggered to conduct the sigma-delta modulation at the rising edge of the corresponding control signal.

12. The digital controller of claim 8, wherein the delay time of the unit delay block is equal to the switching cycle of the corresponding switching circuit.

\* \* \* \* \*